(12) United States Patent
Skeffington et al.

(10) Patent No.: US 9,921,888 B1
(45) Date of Patent: Mar. 20, 2018

(54) MIXED CRITICALITY CONTROL SYSTEM

(71) Applicant: General Electric Company, Schenectady, NY (US)

(72) Inventors: Wesley Michael Skeffington, Niskayuna, NY (US); William Smith, Niskayuna, NY (US); Austars Schnore, Jr., Niskayuna, NY (US); Daniel Sexton, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/244,681

(22) Filed: Aug. 23, 2016

(51) Int. Cl.
*G06F 3/00* (2006.01)
*G06F 9/44* (2018.01)
*G06F 9/46* (2006.01)
*G06F 13/00* (2006.01)
*G06F 9/54* (2006.01)
*H04L 29/08* (2006.01)
*G05B 15/02* (2006.01)

(52) U.S. Cl.
CPC .............. *G06F 9/54* (2013.01); *G05B 15/02* (2013.01); *H04L 67/325* (2013.01)

(58) Field of Classification Search
None
See application file for complete search history.

(56) References Cited

U.S. PATENT DOCUMENTS

| 6,094,575 | A  | * | 7/2000  | Anderson ............. H04W 52/04 455/415 |
|-----------|----|---|---------|------------------------------------------|
| 6,684,343 | B1 |   | 1/2004  | Bouchier et al. |
| 8,776,090 | B2 |   | 7/2014  | Elzur |
| 8,904,405 | B1 |   | 12/2014 | Peeters et al. |
| 9,141,417 | B2 |   | 9/2015  | Weber |
| 2003/0193395 | A1 | * | 10/2003 | Ahiska .................. G08B 25/08 340/540 |
| 2007/0094670 | A1 |   | 4/2007  | Graves |
| 2007/0226795 | A1 |   | 9/2007  | Conti et al. |

(Continued)

FOREIGN PATENT DOCUMENTS

GB        2473136 A     3/2011

OTHER PUBLICATIONS

Todd Carpenter, MiCART™: Mixed Criticality Real-time Hypervisor. 2013 DHS S&T/DoD ASD (R&E) Cyber Security SBIR Workshop, Jul. 23, 2013.
Crespo et al., Mixed Criticality in Control Systems, Preprints of the 19th World Congress the International Federation of Automatic Control, Aug. 24-29, 2014.
Burns et al., MCC—Mixed Criticality Embedded Systems on Many-Core Platforms, University of York Department of Computer Science.

(Continued)

*Primary Examiner* — Chat Do
*Assistant Examiner* — William C Wood
(74) *Attorney, Agent, or Firm* — Nitin N. Joshi

(57) ABSTRACT

A control system includes a multi-core processor configured to operate plural different applications performing different operations for controlling a controlled system. The applications are associated with different levels of criticality based on the operations performed by the applications. The processor is configured to provide a single hardware platform providing both spatial and temporal isolation between the different applications based on the different levels of criticality associated with the different applications. The processor also is configured to synchronize communications of the applications operating in a real time operating system with scheduled communications of a time sensitive network (TSN).

21 Claims, 3 Drawing Sheets

(56) References Cited

U.S. PATENT DOCUMENTS

| | | | |
|---|---|---|---|
| 2008/0163239 A1 | 7/2008 | Sugumar et al. | |
| 2009/0282266 A1* | 11/2009 | Fries | G06F 21/602 |
| | | | 713/193 |
| 2011/0302400 A1* | 12/2011 | Maino | G06F 21/575 |
| | | | 713/2 |
| 2012/0284732 A1* | 11/2012 | Griglock | G06F 9/5066 |
| | | | 718/104 |
| 2013/0145375 A1 | 6/2013 | Kang | |
| 2015/0160973 A1 | 6/2015 | Kandasamy et al. | |
| 2015/0350019 A1* | 12/2015 | Terayama | H04L 41/0816 |
| | | | 709/221 |
| 2015/0372907 A1* | 12/2015 | Korhonen | H04L 45/66 |
| | | | 370/236 |
| 2016/0117210 A1* | 4/2016 | Reichenbach | G06F 11/0712 |
| | | | 714/37 |

OTHER PUBLICATIONS

Robert Day, Hypervisors Ease the World of Multicore Processors. RTC LynuxWorks, Jun. 2010.
Garcia-Valls et al., Challenges in real-time virtualization and predictable cloud computing, Journal of Systems Architecture, 2014.
Na, Secure Virtualization Combines Traditional Desktop OSs and Embedded RTOSs in Military Embedded Systems, Lynx Software Technologies, May 10, 2010
International Search Report and Written Opinion issued in connection with corresponding PCT Application No. PCT/US2017/044820 dated Oct. 24, 2017.

\* cited by examiner

MIXED CRITICALITY CONTROL SYSTEM

FIELD

Embodiments of the subject matter described herein relate to control systems that control operation of one or more assets using several applications.

BACKGROUND

Control systems direct the operations of various other systems (which can be referred to as controlled systems), such as equipment or machines, to perform many functions of the controlled systems. The control systems may direct the asset operations using software applications having a variety of different levels of criticality to the overall operation of the powered system being controlled by a control system. For example, applications that control safe operation of the controlled system, may have a higher level of criticality to the operation of the controlled system than other applications, such as applications that monitor the system, that diagnose problems with the controlled system, that provide displays to an operator, etc.

Control system platforms may support a large number of independent and dependent functions related to multiple levels of a controlled system of varying criticality that are encoded in software and executed on a merged and multi-tenant centralized or distributed hardware platform. These control system platforms may operate with the mixed criticality of the various functions by physically isolating or segregating the different functions with different hardware components of the controlled system, hard coding functionality in the different components, and/or preventing change (e.g., updates) to the controlled system. As a result, these control systems are highly restrictive in developing improvements or making other changes to the control systems.

BRIEF DESCRIPTION

In one embodiment, a control system includes a multi-core processor configured to operate plural different applications performing different operations for controlling a controlled system. The applications are associated with different levels of criticality based on the operations performed by the applications. The processor is configured to provide a single hardware platform providing both spatial and temporal isolation between the different applications based on the different levels of criticality associated with the different applications. The processor also is configured to synchronize communications of the applications operating in a real time operating system with scheduled communications of a time sensitive network (TSN).

In one embodiment, a control method includes performing different operations for controlling a controlled system using plural different applications operating on a multi-core processor. The applications are associated with different levels of criticality based on the operations performed by the applications. The method also can include spatially isolating the different applications on the multi-core processor based on the different levels of criticality associated with the different applications, and temporally isolating the different applications in a TSN through which the different applications communicate with one or more of a sensor, a transducer, or the controlled system. The method also can include synchronizing communications of the applications operating in a real time operating system with scheduled communications of the TSN.

In one embodiment, a control system includes a processor configured to operate plural different applications performing different operations for changing a state of a controlled system. The applications are associated with different levels of criticality based on the operations performed by the applications. The processor is configured to provide a single hardware platform providing both spatial and temporal isolation between the different applications based on the different levels of criticality associated with the different applications. The processor also is configured to synchronize communications of the applications in an operating system with a communication schedule of a TSN.

BRIEF DESCRIPTION OF THE DRAWINGS

The subject matter described herein will be better understood from reading the following description of non-limiting embodiments, with reference to the attached drawings, wherein below.

DETAILED DESCRIPTION

Embodiments of the inventive subject matter described herein include control systems and methods that provide a mixed criticality platform that runs a large number of concurrent or simultaneous applications with customized redundancy, increased security, and modularity, while avoiding hampering the functionality of higher criticality applications. The control systems and methods described herein utilize both time (or temporal) and space partitioning of the computing and communication components of the control systems. The modularity of the applications allows for the hosting of a wide variety of different applications across a wide variety of hardware components, increased availability through replication of application functionality, and the ability to scale up to meet surges in applications and future needs. The control systems and method facilitate faster commissioning of new or updated applications, the ability to detect and correct defects in the applications (e.g., relative to other control systems and methods), and the ability to integrate into higher level management systems. The platform provided by the control systems and methods result in an integrated, multi-tenancy control solution that can host a variety of applications that individually have different lifecycles, criticality levels, scaling needs, and robustness requirements.

Figure 1:
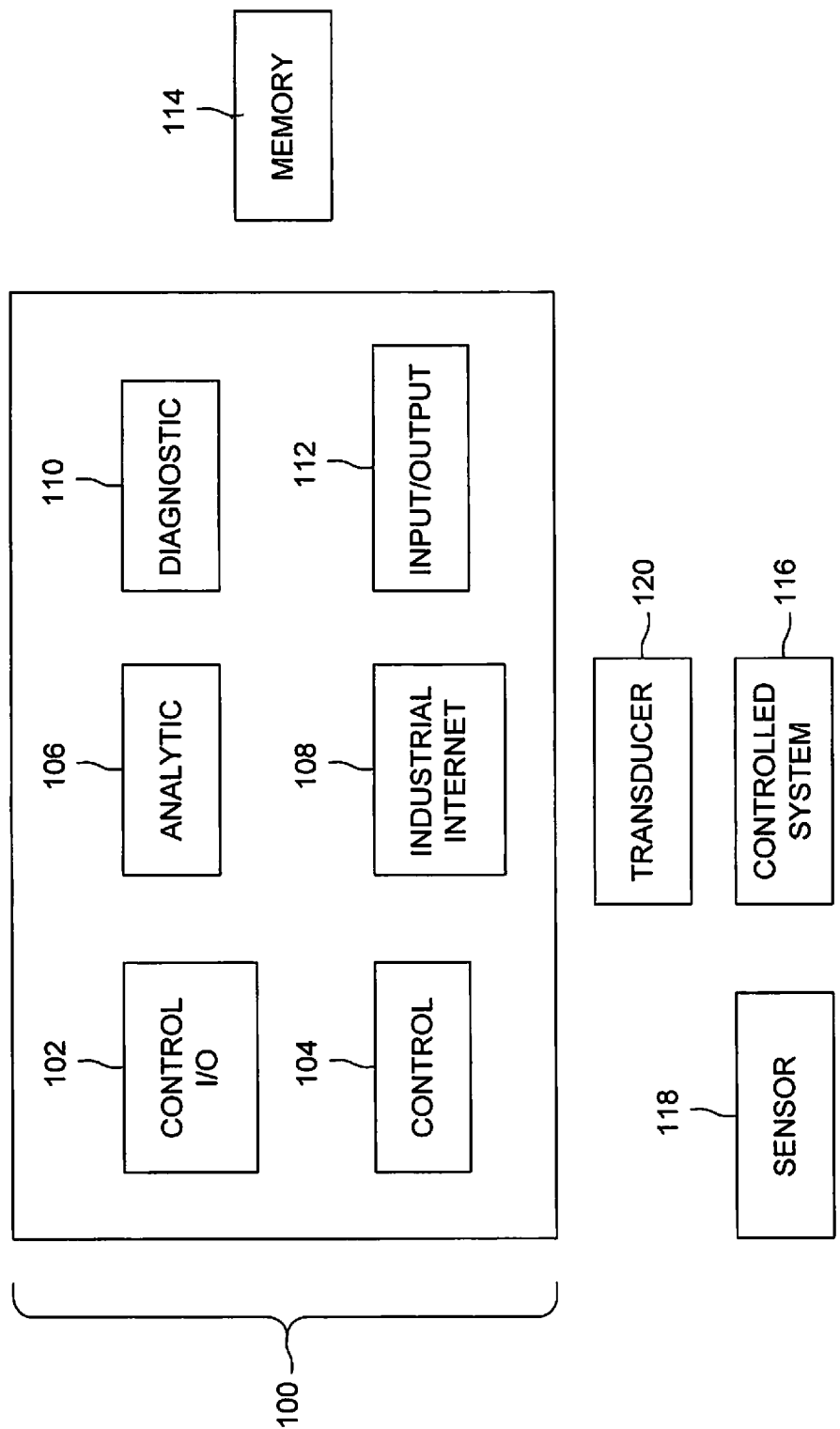
FIG. 1 schematically illustrates one embodiment of a control system.

FIG. 1 schematically illustrates one embodiment of a control system 100. The control system 100 can direct the operations of a multitude of devices or systems (e.g., controlled systems), such as power plants, vehicle systems (e.g., trains, mining vehicles, etc.), medical suites, individual vehicles, turbines, and the like. The control system 100 operates via several applications 102, 104, 106, 108, 110, 112 that monitor and control operation of a controlled system 116. The applications 102, 104, 106, 108, 110, 112 shown and described in connection with FIG. 1 are provided merely as one example, as different components 102, 104, 106, 108, 110, 112 may be used to monitor and/or control different controlled systems 116. Examples of controlled systems 116 include power plants, manufacturing facilities, medical suites, etc. The applications 102, 104, 106, 108, 110, 112 represent software operating on hardware circuitry, such as one or more processors (e.g., microprocessors, integrated circuits, and/or field programmable gate arrays) that perform the software functionalities or operations described herein.

The application 102 is a control input/output application that receives input into the control system 100 and generates output from the control system 100 that are used to control operations of the controlled system 116 and/or represent operation of the controlled system 116. The application 102 can obtain data from one or more sensors 118 that generate the data representative of operation of the controlled system 116 and/or one or more input devices (e.g., buttons, switches, levers, other applications, etc.). The sensors 118 can measure temperatures, pressures, airflows, forces, accelerations, power outputs, etc., of the controlled system 116.

The application 104 is a control application component that generates control signals communicated to one or more transducers 120 or other components in order to control operation of the controlled system 116. For example, the control application 104 may generate control signal that causes the transducer 120 to open or close a valve, change a turbine speed, change a rate of fuel flow, change a rate at which medicine is administered to a patient, etc. The control application 104 may generate the control signals based on the data obtained by the control I/O application 102 from the sensors 118 and/or other sources of input.

The analytic application 106 can examine trends in the sensor data to monitor operations of the controlled system 116. The application 106 can generate signals for presentation to one or more operators of the controlled system 116 to notify the operators of the performance of the controlled system 116, the states of the controlled system 116, the output of the controlled system 116, etc. These signals may be communicated to an output device such as a display, touchscreen, haptic device, speaker, or the like. Optionally, the control system 100 may include one or more other applications performing one or more other functions.

The diagnostic application 110 can examine trends in the sensor data to identify changes in operations of the controlled system 116 and/or transducer 120 that indicate a need to repair, replace, and/or inspect the transducer 120 and/or one or more devices of the controlled system 116. The application 110 can generate signals for presentation to one or more operators of the controlled system 116 to notify the operators of the performance of the controlled system 116, the states of the controlled system 116, the output of the controlled system 116, etc. These signals may be communicated to an output device such as a display, touchscreen, haptic device, speaker, or the like. Optionally, the control system 100 may include one or more other applications performing one or more other functions.

The application 112 is an input/output application that controls receipt and communication of information into and out of the control system 100. The application 112 can manage the communication of information to and/or from the applications other than the control application 104.

The industrial Internet application 108 manages communications within a network of equipment, sensors, and associated software. The application 108 can control how and/or when information is communicated between the applications and the sensors 118 or other equipment of the controlled system 116. In one embodiment, the application 108 controls cloud connectivity (e.g., connectivity to one or more networks) of the sensors and/or controlled system.

The applications 102, 104, 106, 108, 110, 112 may require access to data provided by the sensors 118 related to the controlled system 116, may need the ability to perform computations on the sensor data that are dependent on the inputs from the sensors 118, may need to access internal stored state and control laws, may need to evaluate these state and control laws to produce an output, and/or may need to present the output that is fed to the transducer 120 to effect the operation of the controlled system 116. This process can be referred to as the control loop of the controlled system 116. To achieve these requirements, the control system 100 may rely on a high level of determinism to simplify and make possible very stringent timed control loops. Given the complexity of the controlled system 116, there may be many control loops responsible for the care and feeding of information concerning the controlled system 116.

The applications 102, 104, 106, 108, 110, 112 may have different designated levels of criticality associated with the applications. The criticality levels for the applications may vary among different control systems. The criticality level associated with a function performed by an application 102, 104, 106, 108, 110, 112 indicates or represents the relative importance of the function in terms of the safety and/or performance of the controlled system 116. The criticality levels of the functions may be set or designated by the operator or designer of the system 100. While some control systems may physically isolate or segregate different application from each other to ensure that the components performing the functions associated with higher criticality levels have the network bandwidth, processing ability, and security needed to ensure that the functions are performed, this isolation or segregation may make changes to the control systems (e.g., upgrading or modifying the application, adding application or functionality, etc.) difficult or costly to implement.

Figure 2:
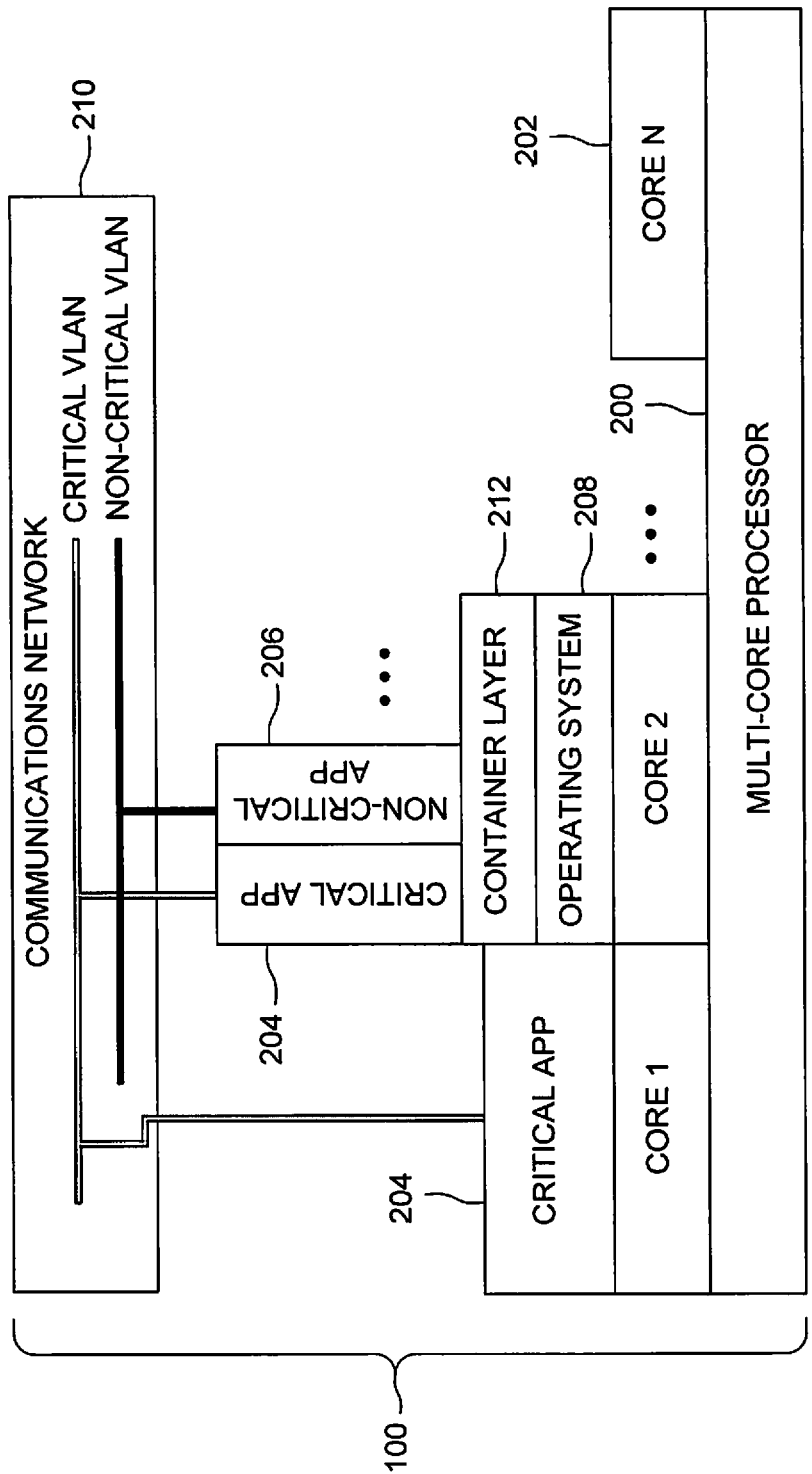
FIG. 2 illustrates one embodiment of the control system shown in FIG. 1 using multiple levels of isolation.

FIG. 2 illustrates one embodiment of the control system 100 using multiple levels of isolation and abstraction to ensure that the functions performed by the applications 102, 104, 106, 108, 110, 112 of the control system 100 are performed according to the different levels of criticality associated with the functions. The control system 100 provides a single hardware platform that uses time and space portioning of the functions performed by the applications 102, 104, 106, 108, 110, 112 in order to ensure that the functions associated with the higher criticalities have sufficient network bandwidth and processing in order to perform the functions in a timely manner.

The control system 100 includes a multi-core processor 200 having two or more independently operating processors or processing units 202 ("Core 1," "Core 2," and "Core N" in FIG. 2). The processor 200 can represent a single hardware platform that spatially isolates the applications 102, 104, 106, 108, 110, 112. The spatial isolation or segregation of the functions performed by the applications 102, 104, 106, 108, 110, 112 can be at least partially achieved by dividing the functions up among different processing units 202. For example, different cores of the multi-core processor 200 may run applications of different criticality levels.

The Core 1 processing unit 202 may perform the higher criticality functions of the applications, while one or more other processing units 202 may perform the lower criticality functions of other applications. Optionally, the functions of the applications may be performed by different processing units 202 of the same processor 200 based on the life cycles of the applications. Containers may be used for different applications to allow the applications to have different life cycles. For example, containers 204, 206 for critical and non-critical applications ("Critical App" and "Non-Critical App," respectively, in FIG. 2) can be created to allow the applications to have the different life cycles (e.g., the time period between different versions or generations of the applications). The applications in the different containers may operate on the same processing unit 202.

Some of the applications may operate within an operating system 208. The operating system 208 may operate within a processing unit 202 of the processor 200 that differs from the processing unit or units 202 on which other applications (e.g., applications 204 with higher levels of criticality) operate. One or more of the processing units 202 may create and operate virtual machines (VM) and/or containers 212 that run the applications performed by one or more of the applications. A VM may be an emulation of a computer system operating on a processing unit 202, and a container may be an operating-system-level virtual computing environment that allows for the concurrent operation of multiple isolated applications using containers on a single VM processing unit 202.

These VMs can further isolate the different functions performed by the applications from each other by the different VMs running different applications associated with different levels of criticality. In one example, higher criticality applications may be run by separate VMs, while multiple lower-criticality applications may run on the same VM.

The use of different VMs for applications having different criticality levels provides modularity to the applications that can be used to ensure that changes to one application do not negatively impact, require modification of, and/or require downtime of other applications. For example, if a less critical application is to be updated or added to the control system 100, the VM running the application may be taken down (e.g., deactivated) and stopped from interacting or communication with other components while the application is updated and/or a new VM may be created when the application is to begin operating. This can prevent the updated or new application from interfering with other applications as the other applications can continue operating in different respective VMs.

With respect to the time or temporal isolation or segregation of the different applications having different levels of criticality, the control system 100 may use a communications network 210 that communicates data to and/or from the various applications at different times and/or using different amounts of network bandwidth. The times and/or bandwidth used for communication by the different applications is based on the levels of criticality associated with the applications. In one embodiment, the communications network 210 is a TSN. For example, the network 210 may be at least partially defined by a set of standards developed by the Time-Sensitive Networking Task Group, and includes one or more of the IEEE 802.1 standards. While an Ethernet network may operate without a TSN, such a network may communicate data frames or packets in a random or pseudo-random manner that does not ensure that the data is communicated within designated time periods or at designated times. As a result, some data may not reach devices connected via the non-TSN Ethernet network in sufficient time for the devices to operate using the data. A TSN-based network, however, can dictate when certain data communications occur to ensure that certain data frames or packets are communicated within designated time periods or at designated times. Data transmissions within a TSN-based Ethernet network can be based on a global time or time scale of the network that is the same for the devices in or connected with the network, with the times or time slots in which the devices communicate being scheduled for at least some of the devices.

In one embodiment, the control system 100 uses higher priority communication times and/or more bandwidth for communicating data to and/or from the higher criticality applications relative to the lower criticality applications. A higher priority communication time can mean that the communications from the higher criticality applications are communicated before or in place of the communications from the lower criticality applications. For example, in the event that there is insufficient network bandwidth to communicate the data to or from all or several of the applications, the network 210 may communicate the data to or from the higher criticality applications first and delay the communications from or to the lower criticality applications unless or until there is sufficient bandwidth for the lower criticality communications to be communicated. This can ensure that the communications to or from the higher criticality applications are communicated for the higher criticality functions, while the communications to or from the lower criticality applications are communicated when the control system 100 is able, without risking the communications of the higher criticality applications.

The control system 100 may synchronize the communications of operating systems 208 with communications within the TSN by driving a shared scheduled between the TSN and the operating system. For example, the control system 100 may use a real time operating system (RTOS) as an operating system 208 to run one or more of the applications described herein. The RTOS may schedule communications between different applications at designated times. For example, the application communications may occur every twenty seconds in the RTOS. A TSN, however, may have different amounts of bandwidth available for communication at different times. The control system 100 may synchronize the communications of the applications operating within the RTOS with the available bandwidth in the TSN. For example, the TSN may have a sufficient amount of bandwidth available for communication of applications operating within the RTOS every thirty seconds. The control system 100 may schedule communications between the RTOS to occur on the same schedule as the TSN. For example, the control system 100 may direct the applications operating in the RTOS to communicate every thirty seconds (e.g., at the same times that the bandwidth is scheduled to be available within the TSN).

The control system 100 effectively creates different virtual local area networks (LAN) for the communications of the different criticality level applications in one embodiment. For example, the modems, routers, switches, or other devices forming the network 210 can communicate the data from and/or to the higher criticality applications differently from the modems, routers, switches, etc., of the network 210 communicating the data of the lower criticality applications. The LAN associated with the higher criticality applications are communicated at the designated times (or as soon as the application attempts to communicate data), while the LAN associated with the lower criticality applications may communicate when there are sufficient network resources for the communications to occur. The communication traffic of the lower criticality applications may be treated as best effort traffic. Best effort traffic includes the communication of data at a higher priority than the data communicated in rate constrained traffic, but at a lower priority than the data communicated according to schedules dictated by the control system. The rate constrained traffic can include data that is communicated.

The applications may interact with different LANs in the network 210 to allow for the lower criticality applications to be deployed throughout the control system 100 without interfering with the higher criticality applications. For example, a new or updated application that generates displays for an operator to view data or output of the controlled system 116 may be added to the control system 100 via a LAN (or portion of the network 210) that differs from the LAN (or portion of the network 210) through which higher criticality applications communicate. The new or updated application can be added to the control system 100 without interfering with communication of the higher criticality applications through a different portion of the network 210.

The control system 100 may provide security features that control access to the different applications. In one embodiment, a Trusted Protection Module (TPM) is included in the processor 200. The TPM stores cryptograph keys used for the communication of information to and/or from the applications. This allows for tiered application security in that a VM may be secured with a key and operating during operation of another, less secure VM.

Figure 3:
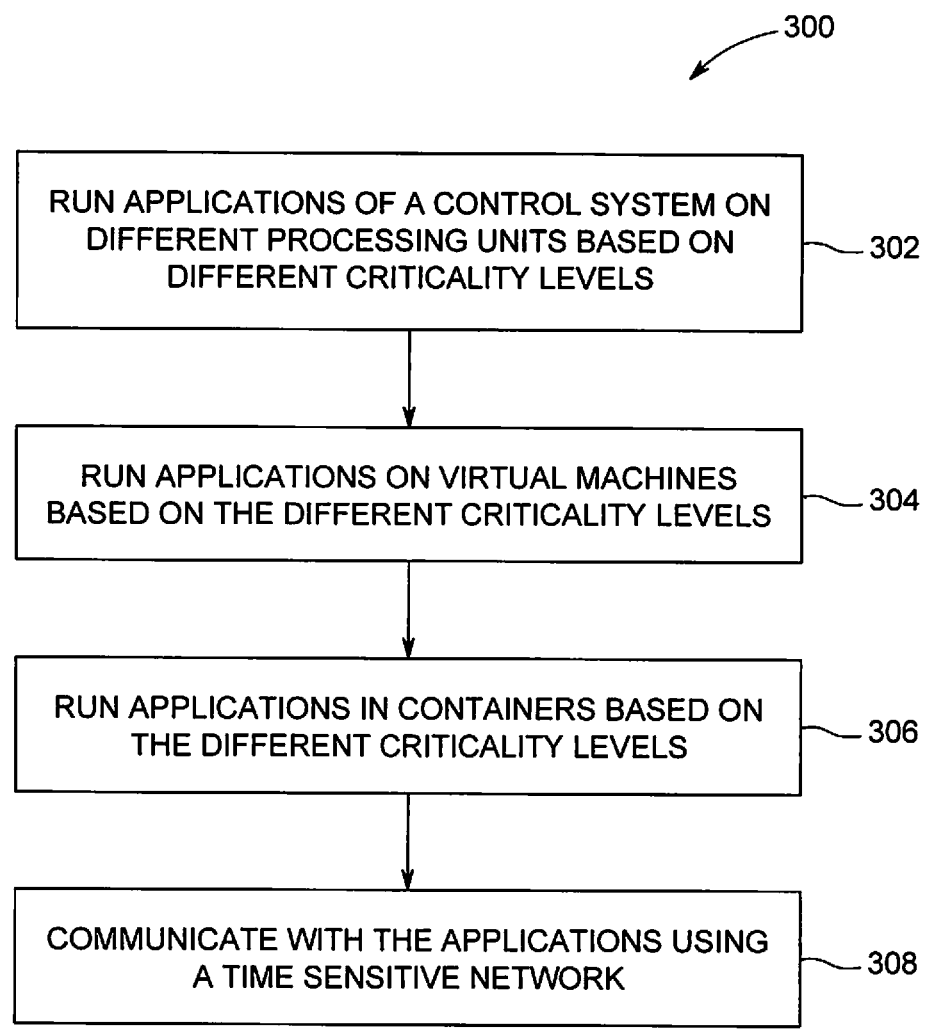
FIG. 3 illustrates a flowchart of one embodiment of a method for operating a control system.

FIG. 3 illustrates a flowchart of one embodiment of a method 300 for deploying a control system having mixed criticality applications. The method 300 may be used to set up or configure the control system 100, or be performed by one or more embodiments of the control system 100 described herein. At 302, applications of a control system having different criticality levels are run on different processing units of a multi-core processor based on the different criticality levels. The applications having higher levels of criticality may operate on processing units that are different from other high criticality applications and/or lower criticality applications. This can help to ensure that a processing unit is dedicated to running a high criticality application to avoid operation of the high criticality application being hampered or interfered with by other applications.

At 304, the applications are run on virtual machines based on the different criticality levels. For example, different virtual machines may run different criticality level applications. This can permit updates to be made to one application running on one virtual machine from interfering with operation of another application running on another virtual machine. This also can permit new applications to be introduced on a new virtual machine, or a different machine than one running a high criticality application, without interrupting or interfering with the high criticality applications.

At 306, the applications are run inside containers based on the different criticality levels. For example, the same virtual machines may run applications within different containers based on the criticality levels of the applications. The applications operating within one container may be lower level criticality applications than the applications operating within another container. This can permit changes (e.g., updates, replacements, and/or new applications) to be made while avoiding interfering with operation of higher criticality applications. This also can permit new applications to be introduced on a new virtual machine, or a different machine than one running a high criticality application, without interrupting or interfering with the high criticality applications.

At 308, the applications communicate with each other, with sensors, with transducers, with output devices, with input devices, and/or the control system through a TSN. The TSN can allow for some applications to have higher priority communications that occur at designated times or within designated time periods to ensure that the higher criticality applications are able to communicate in time and effectively operate, while causing other, lower criticality applications to be able to communicate when sufficient bandwidth and other network resources are available.

In one embodiment, the applications may communicate with each other through the TSN while coordinating with communications of an RTOS. The RTOS may schedule communications between different applications on a schedule while a TSN may have scheduled time periods in which various applications may communicate. For example, a RTOS may schedule applications to communicate every thirty seconds while a TSN may operate by scheduling a communication window (e.g., an amount of bandwidth available for communication) every thirty seconds, which may or may not be used by the applications for communication. The schedule of the RTOS may be synchronized with the TSN schedule by the control system to allow for the scheduled communications of the RTOS to occur during the scheduled communication windows of the TSN.

In one embodiment, a control system includes a multi-core processor configured to operate plural different applications performing different operations for controlling a controlled system. The applications are associated with different levels of criticality based on the operations performed by the applications. The processor is configured to provide a single hardware platform providing both spatial and temporal isolation between the different applications based on the different levels of criticality associated with the different applications. The processor also is configured to synchronize communications of the applications operating in a real time operating system with scheduled communications of a time sensitive network (TSN).

The multi-core processor can be configured to run a trusted platform module that stores encryption keys used by the different applications. The multi-core processor optionally can be configured to receive and operate one or more new applications of the controlled system in addition to the different applications while the different applications continue to operate for controlling the controlled system. In one example, the multi-core processor is configured to communicate with one or more of the controlled system, one or more sensors, and/or one or more transducers via different portions of the TSN based on the different levels of criticality of the different applications. Optionally, the multi-core processor is configured to deploy one or more applications having a lower level of criticality relative to one or more other applications of the different applications without interfering with operation of the one or more other applications having higher levels of criticality.

The applications can include one or more of a control application, an analytic application, a diagnostic application, or an input and output application.

The communication network may be the TNS (e.g., the network operates as the TSN). The controlled system that is controlled by the applications can include or be one or more of a power plant, a vehicle system, a vehicle, a turbine, and/or a medical suite.

In one embodiment, a control method includes performing different operations for controlling a controlled system using plural different applications operating on a multi-core processor. The applications are associated with different levels of criticality based on the operations performed by the applications. The method also can include spatially isolating the different applications on the multi-core processor based on the different levels of criticality associated with the different applications, and temporally isolating the different applications in a time sensitive network (TSN) through which the different applications communicate with one or more of a sensor, a transducer, or the controlled system. The method also can include synchronizing communications of the applications operating in a real time operating system with scheduled communications of the TSN.

The method also can include communicating with the different applications using encryption keys stored in a trusted platform module of the multi-core processor. The method may optionally also include receiving and implementing one or more new applications for controlling the powered system in addition to the different applications while the different applications continue to operate for controlling the controlled system. In one example, the method also includes receiving and implementing one or more application updates while the different applications continue to operate for controlling the controlled system.

Optionally, the method also includes communicating (with the different applications) with one or more of the controlled system, one or more sensors, and/or one or more transducers via different portions of the communication network based on the different levels of criticality of the different applications. The method also may include deploying one or more applications having a lower level of criticality relative to one or more other applications of the different applications without interfering with operation of the one or more other applications having higher levels of criticality. The controlled system that is controlled by the applications in the method can be or include one or more of a power plant, a vehicle system, a vehicle, a turbine, and/or a medical suite.

In one embodiment, a control system includes a processor configured to operate plural different applications performing different operations for changing a state of a controlled system. The applications are associated with different levels of criticality based on the operations performed by the applications. The processor is configured to provide a single hardware platform providing both spatial and temporal isolation between the different applications based on the different levels of criticality associated with the different applications. The processor also is configured to synchronize communications of the applications in an operating system with a communication schedule of a time sensitive network (TSN).

The operating system can be a real time operating system, in one example of the control system. The applications associated with safety functionalities of the controlled system may be associated with higher levels of criticality relative to the applications associated with monitoring functionalities of the controlled system.

The processor optionally can be configured to receive and operate one or more of a new application for controlling the controlled system in addition to the different applications or an update to one or more of the different applications while the different applications continue to operate for controlling the controlled system. The processor can be configured to provide temporal isolation between the different applications by directing the different applications to communicate via different portions of the TSN. The controlled system that is controlled by the applications of the control system can be or include one or more of a power plant, a vehicle system, a vehicle, a turbine, and/or a medical suite.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry.

Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A control system comprising:
   a multi-core processor configured to operate plural different applications performing different operations for controlling a controlled system, the applications associated with different levels of criticality based on the operations performed by the applications, wherein the processor is configured to provide a single hardware platform providing both spatial and temporal isolation between the different applications based on the different levels of criticality associated with the different applications, wherein the processor also is configured to synchronize communications between a real time operating system (RTOS) and a time sensitive network (TSN) such that scheduled communications between the different applications operating in the RTOS occur during scheduled communication windows of the TSN, wherein the multi-core processor is configured to communicate with one or more of the controlled system, one or more sensors, or one or more transducers via different portions of the TSN based on the different levels of criticality of the different applications; and wherein the multi-core processor is configured to deploy one or more applications having a lower level of criticality relative to one or more other applications of the different applications without interfering with operation of the one or more other applications having higher levels of criticality.

2. The control system of claim 1, wherein the multi-core processor is configured to run a trusted platform module (TPM) that secures a higher criticality application with an encryption key when a less secure application is in operation.

3. The control system of claim 1, wherein the multi-core processor is configured to receive and operate one or more new applications of the controlled system In addition to the different applications while the different applications continue to operate for controlling the controlled system.

4. The control system of claim 1, wherein the applications include one or more of a control application, an analytic application, a diagnostic application, or an input and output application.

5. The control system of claim 1, wherein the controlled system that is controlled by the applications includes one or more of a power plant, a vehicle system, a vehicle, a turbine, or a medical suite.

6. The control system of claim 1, wherein a greater communication bandwidth is used for communicating data to and/or from the higher criticality applications relative to the lower criticality applications.

7. The control system of claim 1, wherein the multicore processor includes a plurality of processing units and functions of the applications are performed by different processing units of the plurality of processing units based on life cycles of the respective applications.

8. The control system of claim 7, wherein the plurality of processing units create and operate a plurality of virtual machines (VM) to run the applications.

9. The control system of claim 1, wherein different virtual machines of the plurality of virtual machines run different application associated with different levels of criticality.

10. The control system of claim 1, wherein synchronizing communications comprises scheduling communications of the RTOS to occur during scheduled communication windows of the TSN.

11. A control method comprising:
performing different operations for controlling a controlled system using plural different applications operating on a multi-core processor, the applications associated with different, levels of criticality based on the operations performed by the applications;
spatially isolating the different applications on the multi-core processor based on the different levels of criticality associated with the different applications;
temporally isolating the different applications in a time sensitive network (TSN) through which the different applications communicate with one or more of a sensor, a transducer, or the controlled system;
synchronizing communications between a real time operating system (RTOS) and the TSN such that scheduled communications between the different applications operating in the RTOS occur during scheduled communication windows in the TSN;
communicating, with the different applications, with one or more of the controlled system, one or more sensors, or one or more transducers via different portions of the TSN based on the different levels of criticality of the different applications; and
deploying one or more applications having a lower level of criticality relative to one or more other applications of the different applications without interfering with operation of the one or more other applications having higher levels of criticality.

12. The control method of claim 11, further comprising communicating with the different applications using encryption keys stored in a trusted platform module of the multi-core processor.

13. The control method of claim 11, further comprising receiving and implementing one or more new applications for controlling the powered system in addition to the different applications while the different applications continue to operate for controlling the controlled system.

14. The control method of claim 11, further comprising receiving and implementing one or more application updates while the different applications continue to operate for controlling the controlled system.

15. The control method of claim 11, wherein the controlled system that is controlled by the applications includes one or mom of a power plant, a vehicle system, a vehicle, a turbine, or a medical suite.

16. A control system comprising:
a processor configured to operate plural different applications performing different operations for changing a state of a controlled system, the applications associated with different levels of criticality based on the operations performed by the applications, wherein the processor is configured to provide a single hardware platform providing both spatial and temporal isolation between the different applications based on the different levels of criticality associated with the different applications, the processor also configured to synchronize communications between an operating system (OS) and a time sensitive network (TSN) such that scheduled communications between the different applications operating in the OS occur during scheduled communication windows in the TSN, wherein the processor is configured to communicate with one or more of the controlled system, one or more sensors, or one or more transducers via different portions of the TSN based on the different levels of criticality of the different applications; and wherein the processor is configured to deploy one or more applications having a lower level of criticality relative to one or more other applications of the different applications without interfering with operation of the one or more other applications having higher levels of criticality.

17. The control system of claim 16, wherein the operating system is a real time operating system.

18. The control system of claim 16, wherein the applications associated with safety functionalities of the controlled system are associated with higher levels of criticality relative to the applications associated with monitoring functionalities of the controlled system.

19. The control system of claim 16, wherein the processor is configured to receive and operate one or more of a new application for controlling the controlled system in addition to the different applications or an update to one or more of the different applications while the different applications continue to operate for controlling the controlled system.

20. The control system of claim 16, wherein the processor is configured to provide temporal isolation between the different applications by directing the different applications to communicate via different portions of the TSN.

21. The control system of claim 16, wherein the controlled system that is controlled by the applications includes one or more of a power plant, a vehicle system, a vehicle, a turbine, or a medical suite.

\* \* \* \* \*